UNITED STATES PATENT OFFICE.

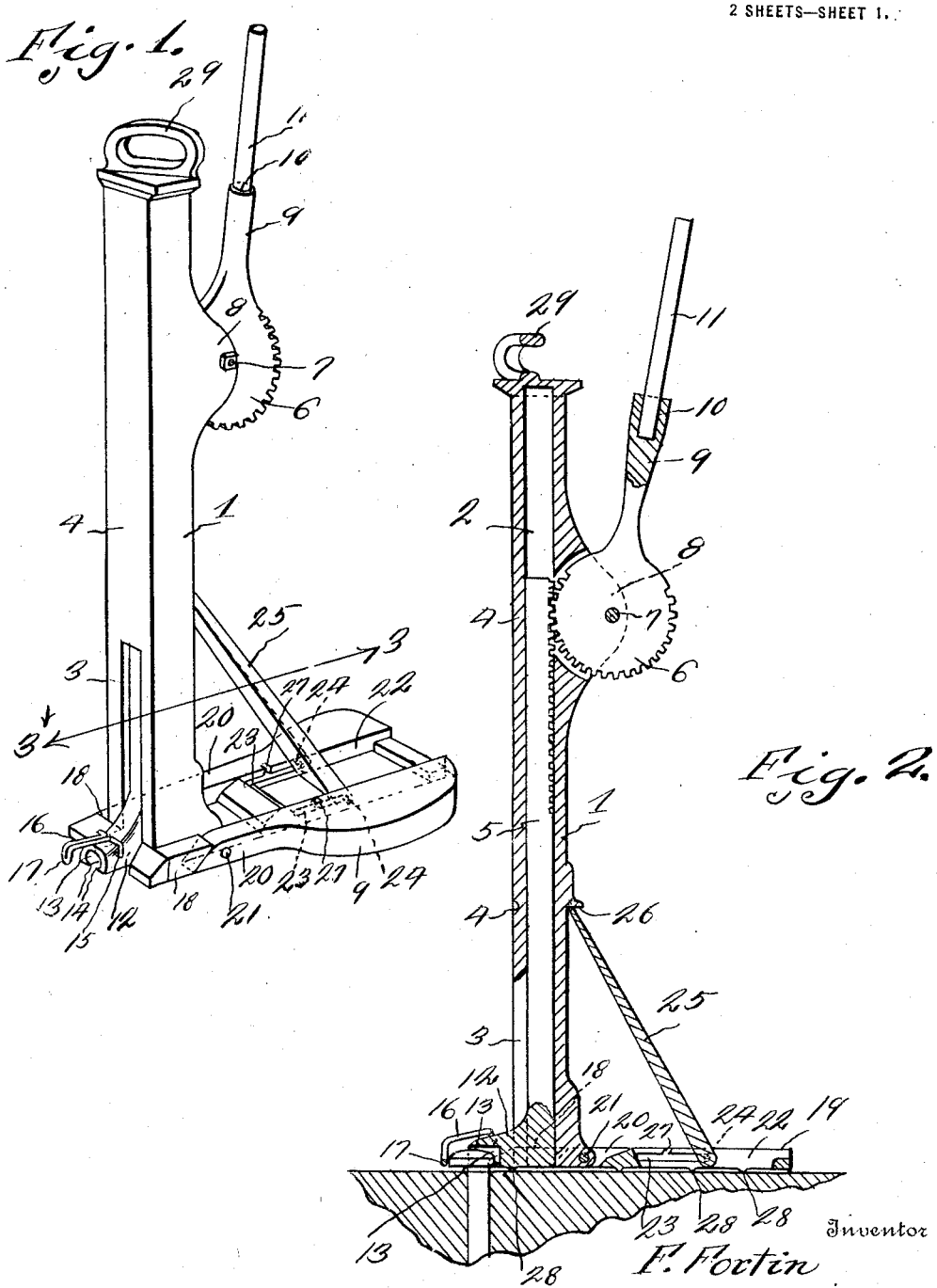

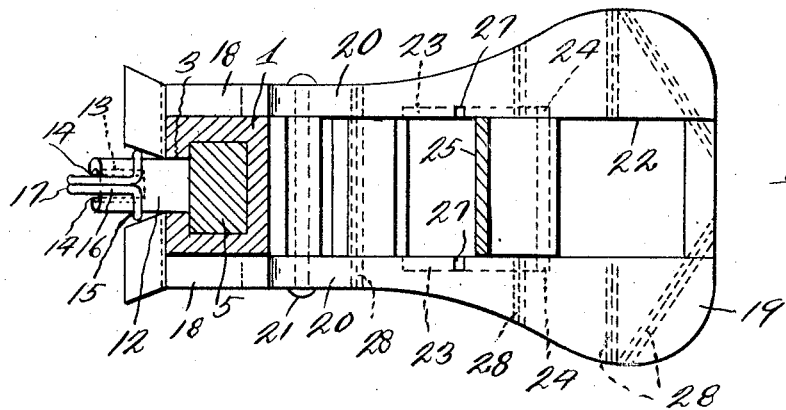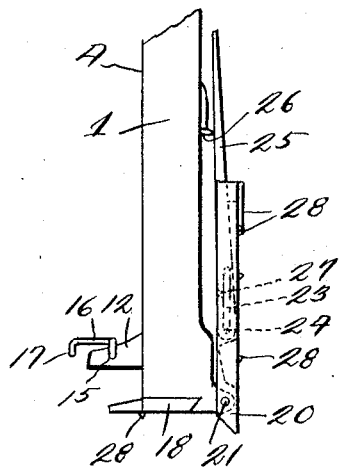

FRANK FORTIN, OF WASHBURN, WISCONSIN.

SPIKE-PULLER.

1,344,628.

Specification of Letters Patent.

Patented June 29, 1920.

Application filed June 17, 1919. Serial No. 304,894.

*To all whom it may concern:*

Be it known that I, FRANK FORTIN, a citizen of the United States, residing at Washburn, in the county of Bayfield, State of Wisconsin, have invented a new and useful Spike-Puller; and I do hereby declare the following to be a full, clear, and exact description of the invention, such as will enable others skilled in the art to which it appertains to make and use the same.

The invention relates to spike pullers and has for its object to provide a spike puller wherein a vertically slidable spike engaging bar is provided, thereby providing means whereby the spike may be pulled from a cross tie vertically, so as not to enlarge the hole in the tie and prevent the placing of another spike within the same. Also to provide a spike puller wherein the marring or disfiguring of the tie, which is a common occurrence with the old claw bars now in use is eliminated.

A further object is to provide anti-skidding means upon the bottom of the spike puller, so that the puller can be used when there is a formation of ice on the tie. Also to provide a foldable base which may be engaged by the foot while the spike puller is in operation and when the same has been moved from place to place may be folded in such a manner that the spike puller as a whole may be easily transported from place to place.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the spike puller, the foldable base being in open position.

Fig. 2 is a vertical sectional view through the spike puller.

Fig. 3 is a sectional view taken on line 3—3 of Fig. 1.

Fig. 4 is a side elevation of the lower end of the spike puller showing the base folded.

Referring to the drawings, the numeral 1 designates a vertical standard, which standard is rectangular in cross section and is provided with a chamber 2. The lower end of the chamber 2 is provided with an elongated opening 3 in the front wall 4 of the standard 1, this opening is preferably of less width than the width of the chamber 2. Slidably mounted in the chamber 2 is a rack bar 5, the teeth of said rack bar meshing with teeth of a segmental gear 6, which gear is pivotally mounted on a pin 7 and is disposed between ears 8 of the standard 1. A handle member 9 is integrally joined to the segmental gear 6, said handle member 9 being provided with a socket 10 in which a bar 11 or other implement may be placed when it is desired to rotate the segmental gear 6. The lower end of the rack bar 5 is provided with an outwardly extending lug 12, which lug is provided with a horizontally disposed slot 13, having flanged edges 14, said edges being adapted to engage under the head of the spike when said head is in the slot 13. Pivoted to the lug 12 as at 15 is a right angle member 16, the end 17 of which is adapted to engage over the head of the spike thereby preventing slipping of the head from the slot 13.

The sides of the standard 1 are provided with integral lugs 18, which lugs form a base for the standard and also form limiting means for the pivoted foot engaging portion 19 of the base. The portion 19 is formed with arms 20, said arms being pivoted to the standard 1, as at 21. Portion 13 is provided with a longitudinal slot 22, said slot having on its side wall longitudinal slots 23, in which slots 23, lugs 24 of a brace member 25 are adapted to slide and be limited, the upper end of said brace member 25 engaging under a lug 26 of the standard 1. The lugs 24 are placed in the slots 23 through notches 27, which communicate with said slots 23. The bottom of the portion 19 and the standard 1 are provided with antiskidding ridges 28.

When it is desired to fold the portion 19 to the position shown in Fig. 4, the upper end of the brace member 25 is moved from engagement, then the lower end of the brace 25 is moved to the opposite end of the slot 23, after which the portion 19 is folded upwardly against the rear face of the standard 1. When the spike puller is in operation the same may be steadied by the handle 29, carried by the standard, this handle may also be utilized for moving the spike puller from place to place.

It will be seen that by placing the head of the spike in the slot 13 and by imparting a downward movement to the handle 11, that the rack bar 5 will be forced vertically upwardly in the chamber 2 and that the spike will be pulled from the cross tie vertically.

The invention having been set forth what is claimed as new and useful is:—

The combination with a vertical standard of a spike puller having a foldable foot engaging base, said base comprising a pivoted member pivoted to the lower end of the standard and having a foldable brace engaging the rear side of the standard and pivoted at its lower end in elongated slots of the foldable base by means of pivot pins engaging said slots, said foldable base being provided with inclined surfaces for engaging inclined surfaces of the standard for limiting the downward pivoting of the base and means whereby the pivotal pins of the base may be easily removed from the slots.

In testimony whereof I have signed my name to this specification in the presence of two subscribing witnesses.

FRANK FORTIN.

Witnesses:
 AUG. F. HOFFMANN,
 GEO. A. CALDER.